(12) United States Patent
Chen et al.

(10) Patent No.: US 9,699,425 B2
(45) Date of Patent: Jul. 4, 2017

(54) WEARABLE PROJECTION APPARATUS AND PROJECTION METHOD

(71) Applicant: BOE TECHNOLOGY GROUP CO., LTD., Beijing (CN)

(72) Inventors: Yanshun Chen, Beijing (CN); Xingxing Zhao, Beijing (CN); Qiushi Xu, Beijing (CN); Yaohui Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 154 days.

(21) Appl. No.: 14/436,405

(22) PCT Filed: Oct. 31, 2014

(86) PCT No.: PCT/CN2014/090022
§ 371 (c)(1),
(2) Date: Apr. 16, 2015

(87) PCT Pub. No.: WO2015/165231
PCT Pub. Date: Nov. 5, 2015

(65) Prior Publication Data
US 2016/0360169 A1    Dec. 8, 2016

(30) Foreign Application Priority Data
Apr. 28, 2014   (CN) .......................... 2014 1 0175568

(51) Int. Cl.
*H04N 9/31*    (2006.01)
*G03B 21/00*   (2006.01)

(52) U.S. Cl.
CPC .......... *H04N 9/3182* (2013.01); *G03B 21/00* (2013.01); *H04N 9/3173* (2013.01); *H04N 9/3188* (2013.01); *H04N 9/3194* (2013.01)

(58) Field of Classification Search
USPC ................................................. 348/744, 745
See application file for complete search history.

(56) References Cited

U.S. PATENT DOCUMENTS 7,016,075 B1 *  3/2006  Tsukada ............... H04N 1/6075
358/1.9
RE44,982 E *   7/2014  Cheong ............ G06K 19/06037
235/494
(Continued)

FOREIGN PATENT DOCUMENTS

CN         101461147 A      6/2009
CN         101841680 A      9/2010
(Continued)

OTHER PUBLICATIONS

May 27, 2015—(CN)—First Office Action for Appn. 201410175568.7 with Eng Tran.
(Continued)

*Primary Examiner* — Paulos M Natnael
(74) *Attorney, Agent, or Firm* — Banner & Witcoff, Ltd.

(57) ABSTRACT

A wearable projection apparatus and a projection method are provided, and the projection method comprises: acquiring color distribution information and brightness distribution information of a plurality of regions of a hand; determining modified color output parameters according to the acquired color distribution information of the regions of the hand and preset standard color information, and determining modified brightness output parameters according to the acquired brightness distribution information of the regions of the hand; controlling a projection module to output an image according to the determined color output parameters and the determined brightness output parameters. With the wearable projection apparatus and the projection method provided by embodiments of the present invention, an image projected (Continued)

by the wearable projection apparatus on the hand can have relatively higher uniformity in color and brightness.

8 Claims, 1 Drawing Sheet

(56) References Cited

U.S. PATENT DOCUMENTS

| | | | | |
|---|---|---|---|---|
| 2006/0139706 A1* | 6/2006 | Kotani | ............... | G09G 5/02 |
| | | | | 358/518 |
| 2007/0122027 A1* | 5/2007 | Kunita | ............... | H04N 13/0242 |
| | | | | 382/154 |
| 2009/0052774 A1* | 2/2009 | Yoshii | ............... | G06T 5/009 |
| | | | | 382/167 |
| 2009/0295712 A1* | 12/2009 | Ritzau | ............... | G06F 1/1626 |
| | | | | 345/156 |
| 2010/0199232 A1* | 8/2010 | Mistry | ............... | G06F 1/163 |
| | | | | 715/863 |
| 2015/0169082 A1* | 6/2015 | Li | ............... | G06F 3/0304 |
| | | | | 345/157 |

FOREIGN PATENT DOCUMENTS

| | | |
|---|---|---|
| CN | 101917631 A | 12/2010 |
| CN | 102244757 A | 11/2011 |
| CN | 103454765 A | 12/2013 |
| CN | 103561223 A | 2/2014 |
| CN | 103974049 A | 8/2014 |
| KR | 20080033755 A | 4/2008 |

OTHER PUBLICATIONS

Feb. 10, 2015—International Search Report for Appn PCT/CN2014/090022 with Eng Tran of Written Opinion.

Nov. 20, 2015—(KR)—Office Action Appn 10-2015-7012704 with English Tran.

Koisraco. Inventive design of Israel, "wearable projection device" for converting the hand into a display device, koisraco blog, [online], Mar. 7, 2014, [searched on Nov. 19, 2015], Internet: <URL: <http://blog.naver.com/koisraco/90191662716>>; with English Tran.

* cited by examiner

WEARABLE PROJECTION APPARATUS AND PROJECTION METHOD

The application is a U.S. National Phase Entry of International Application No. PCT/CN2014/090022 filed on Oct. 31, 2014, designating the United States of America and claiming priority to Chinese Patent Application No. 201410175568.7 filed on Apr. 28, 2014. The present application claims priority to and the benefit of the above-identified applications and the above-identified applications are incorporated by reference herein in their entirety.

TECHNICAL FIELD

Embodiments of the invention relate to a wearable projection apparatus and a projection method.

BACKGROUND

A wearable projection apparatus employs a hand as a projection screen.

However, shapes, palmprints and colors of hands of different users are quite different, as shown in FIG. 1, when an image is projected by a wearable projection apparatus 02, a projection angle between light emitted from the wearable projection apparatus 02 and a hand 01 is relatively small, and an angle difference between a nearest point and a farthest point of the light emitted from the wearable projection apparatus 02 is great; moreover, when the light emitted from the wearable projection apparatus 02 is to display an image on the hand 01, widths of parts located on both sides of a centerline, L1 and L2, are different, resulting in poor uniformity in color and brightness of the image projected on the hand.

SUMMARY OF THE INVENTION

Embodiments of the present invention provide a wearable projection apparatus and a projection method; the wearable projection apparatus forms an image with relatively high uniformity in color and brightness, when projecting the image on a hand by using the projection method.

In one aspect, an embodiment of the present invention provides a projection method of a wearable projection apparatus, comprising: acquiring color distribution information and brightness distribution information of a plurality of regions of a hand; determining modified color output parameters according to the acquired color distribution information of the regions of the hand and preset standard color information, and determining modified brightness output parameters according to the acquired brightness distribution information of the regions of the hand; controlling a projection module to output an image according to the determined color output parameters and the determined brightness output parameters.

Exemplarily, the acquiring color distribution information and brightness distribution information of the regions of a hand, comprises: acquiring RGB pattern information of the regions of the hand; determining the color distribution information and the brightness distribution information of the regions of the hand according to the acquired RGB pattern information of the regions of the hand.

Exemplarily, the determining modified color output parameters according to the acquired color distribution information of the regions of the hand and preset standard color information, comprises: determining a reference color value according to the acquired color distribution information of the regions of the hand, and determining the modified color output parameters according to the determined reference color value, the preset standard color information and the determined color distribution information of the regions of the hand.

Exemplarily, the reference color value is an average value of color information of all colors in a central region of the hand.

Exemplarily, the determining the modified color output parameters according to the determined reference color value, the preset standard color information and the determined color distribution information of the regions of the hand, is performed by calculating using formulae as follows:

$$\begin{cases} \Delta U = U_s - U_0 \\ \Delta V = V_s - V_0 \end{cases}$$

$$\begin{cases} U'(x, y) = U(x, y) + \Delta U \\ V'(x, y) = V(x, y) + \Delta V \end{cases}$$

where, $U'(x,y)$ is a modified red tone output parameter; $V'(x,y)$ is a modified blue tone output parameter; $U(x,y)$ is red tone information in the color distribution information of the regions of the hand; $V(x,y)$ is blue tone information in the color distribution information of the regions of the hand; $U_s$ is red tone information in the preset standard color information; $U_0$ is a red tone value in the determined reference color value; $V_s$ is blue tone information in the preset standard color information; and $V_0$ is a blue tone value in the determined reference color value.

Exemplarily, the determining modified brightness output parameters according to the acquired brightness distribution information of the regions of the hand, comprises: determining brightness correction factors of the regions of the hand according to the acquired brightness distribution information of the regions of the hand, and determining the modified brightness output parameters according to the brightness correction factors of the regions and the determined brightness distribution information of the regions of the hand.

Exemplarily, the determining the modified brightness output parameters according to the brightness correction factors of the regions and the determined brightness distribution information of the regions of the hand is performed by calculating using formulae as follows:

$$\text{Hand}(x,y) = Y(x,y)/Y(\max)$$

$$Y'(x,y) = Y(x,y) \times \text{Hand}(x,y)$$

where $Y'(x,y)$ is the modified brightness output parameter; $Y(x,y)$ is the brightness distribution information of the regions of the hand; $\text{Hand}(x,y)$ is the brightness correction factor; and $Y(\max)$ is a highest brightness value in the brightness distribution information of the regions of the hand.

Exemplarily, the determining the modified brightness output parameters according to the brightness correction factors of the regions and the determined brightness distribution information of the regions of the hand is performed by calculating using formulae as follows:

$$Y' = Y * \partial$$

$$\partial = \left( a\tan \frac{h * \tan\theta_0 - \frac{L}{N} * \left(\frac{N}{2} - i\right)}{h} - a\tan \frac{h * \tan\theta_0 - \frac{L}{N} * \left(\frac{N}{2} - i + 1\right)}{h} \right) /$$

$$(\varphi/N)$$

where, Y' is the modified brightness output parameters; Y is the brightness distribution information of the regions of the hand; $\partial$ is the brightness correction factor; h is a distance from a center of a light outgoing surface of the projection apparatus to the hand; $\phi$ is a light outgoing angle of the light outgoing surface of the projection apparatus; $\theta_0$ is an angle between a centerline of the light outgoing angle of the light outgoing surface of the projection apparatus and the hand; L is a length of a projection region on the hand of the projection apparatus from an end close to the projection apparatus to an end away from the projection apparatus; N is a total number of pixel rows of the projection region on the hand of the projection apparatus in a direction from the end close to the projection apparatus to the end away from the projection apparatus; i is a row number of a certain pixel in the projection region on the hand of the projection apparatus in the direction from the end close to the projection apparatus to the end away from the projection apparatus.

In another aspect, an embodiment of the present invention further provides a wearable projection apparatus, comprising: an acquisition device, configured to acquire pattern information of a plurality of regions of a hand; a processing unit, configured to be in signal connection with the acquisition device and acquire color distribution information and brightness distribution information of the regions of the hand according to the pattern information of the regions of the hand acquired by the acquisition device, determining modified color output parameters according to the acquired color distribution information of the regions of the hand and the preset standard color information, and determining modified brightness output parameters according to the acquired brightness distribution information of the regions of the hand; a projection module, configured to output an image according to the determined color output parameters and the determined brightness output parameters.

Exemplarily, the acquisition device is an RGB camera, having a light-collecting direction in parallel with a light-outgoing direction of the projection module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
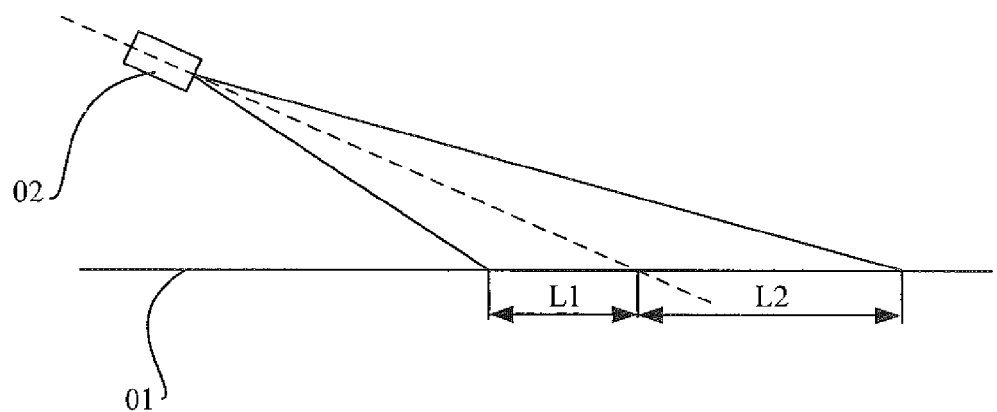
FIG. 1 is a schematic diagram of a wearable projection apparatus when projecting an image on a hand.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the present invention provides a projection method of a wearable projection apparatus, the projection method comprising: step S201: acquiring color distribution information and brightness distribution information of a plurality of regions of a hand;

Step S202: determining modified color output parameters according to the acquired color distribution information of the regions of the hand and preset standard color information, and determining modified brightness output parameters according to the acquired brightness distribution information of the regions of the hand;

Step S203: controlling a projection module to output an image according to the determined color output parameters and the determined brightness output parameters.

Exemplarily, in the embodiment of the present invention, the preset standard color information is a display standard of a display system, for example, a general PC system uses an sRGB standard, and a TV system uses a NTSC standard.

In the projection method of the wearable projection apparatus as described above, before the projection is started, the color distribution information and the brightness distribution information of the regions of the hand are acquired at first in step S201; and then the modified color output parameters are determined according to the acquired color distribution information, and the modified brightness output parameters are determined according to the acquired brightness distribution information of the regions of the hand in step S202; and finally the projection module of the wearable projection apparatus is controlled to output an image according to the determined color output parameters and the determined brightness output parameters in step S203.

Therein, in the image output parameters finally determined, influence of the hand color on the image projected by the wearable projection apparatus on the hand is adjusted, so that the image projected by the wearable projection apparatus on the hand can have relatively high uniformity in color and brightness.

Exemplarily, in the step S201 as described above, the acquiring color distribution information and brightness distribution information of the regions of the hand includes:

Acquiring RGB pattern information of the regions of the hand;

Determining the color distribution information and brightness distribution information of the regions of the hand according to the acquired RGB pattern information of the regions of the hand; converting the acquired RGB pattern information into YUV format information, thus to determine the color distribution information and the brightness distribution information of the regions of the hand.

Exemplarily, in the step S202 as described above, the determining modified color output parameters according to the acquired color distribution information of the regions of the hand and preset standard color information, includes:

Determining a reference color value according to the acquired color distribution information of the regions of the hand, and determining the modified color output parameters according to the determined reference color value, the preset standard color information and the determined color distribution information of the regions of the hand.

Exemplarily, the reference color value is an average value of color informations of all colors of a central region of the hand.

Exemplarily, the determining the modified color output parameters according to the determined reference color value, the preset standard color information and the determined color distribution information of the regions of the hand, can be calculated by formulae as follows:

$$\begin{cases} \Delta U = U_s - U_0 \\ \Delta V = V_s - V_0 \end{cases}$$

$$\begin{cases} U'(x, y) = U(x, y) + \Delta U \\ V'(x, y) = V(x, y) + \Delta V \end{cases}$$

where, U'(x,y) is a modified red tone output parameter, V'(x,y) is a modified blue tone output parameter, U(x,y) is red tone information in the color distribution information of the regions of the hand, V(x,y) is blue tone information in the color distribution information of the regions of the hand, $U_s$ is red tone information in the preset standard color information, $U_0$ is a red tone value in the determined reference color value, $V_s$ is blue tone information in the preset standard color information, $V_0$ is a blue tone value in the determined reference color value, and x and y are coordinates of a certain point on the hand.

Exemplarily, in the step S202 as described above, the determining modified brightness output parameters according to the acquired brightness distribution information of the regions of the hand, includes:

Determining brightness correction factors of the regions of the hand according to the acquired brightness distribution information of the regions of the hand, and determining the modified brightness output parameters according to the brightness correction factors of the regions and the determined brightness distribution information of the regions of the hand.

Exemplarily, the determining the modified brightness output parameters according to the brightness correction factors of the regions and the determined brightness distribution information of the regions of the hand can be calculated by formulae as follows:

Hand(x,y)=Y(x,y)/Y(max)

Y'(x,y)=Y(x,y)×Hand(x,y)

where, Y'(x,y) is the modified brightness output parameter, Y(x,y) is the brightness distribution information of the regions of the hand, Hand(x,y) is the brightness correction factor, Y(max) is a highest brightness value in the brightness distribution information of the regions of the hand, and x and y are the coordinates of a certain point on the hand.

Figure 2:
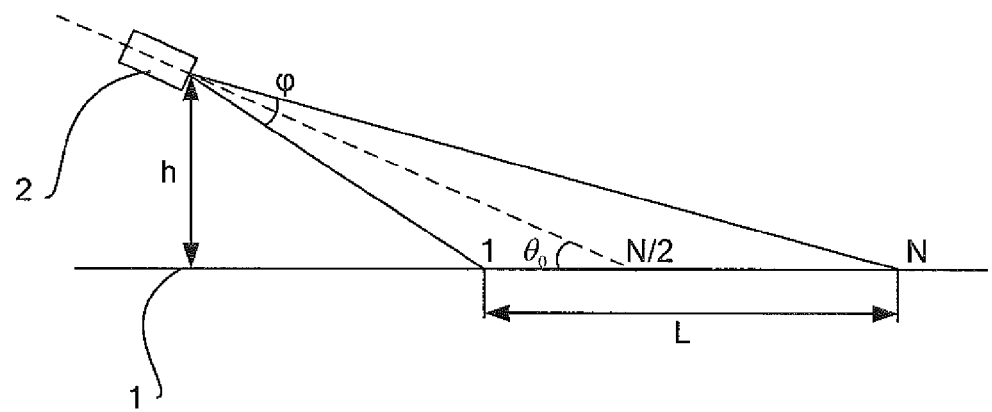
FIG. 2 is another schematic diagram of a wearable projection apparatus when projecting an image on a hand.

Exemplarily, the determining the modified brightness output parameters according to the brightness correction factors of the regions and the determined brightness distribution information of the regions of the hand can be calculated by formulae as follows:

$$Y' = Y * \partial$$

$$\partial = \left( a\tan \frac{h*\tan\theta_0 - \frac{L}{N}*\left(\frac{N}{2} - i\right)}{h} - a\tan \frac{h*\tan\theta_0 - \frac{L}{N}*\left(\frac{N}{2} - i + 1\right)}{h} \right) / (\varphi/N)$$

where, Y' is the modified brightness output parameter; Y is the brightness distribution information of the regions of the hand; $\partial$ is the brightness correction factor, as shown in FIG. 2, h is a distance from a center of a light outgoing surface of the projection apparatus 2 to the hand 1; $\phi$ is a light outgoing angle of the light outgoing surface of the projection apparatus 2; $\theta_0$ is an angle between a centerline of the light outgoing angle of the light outgoing surface of the projection apparatus 2 and the hand 1; L is a length of a projection region on the hand 1 of the projection apparatus 2 from an end close to the projection apparatus 2 to an end away from the projection apparatus 2; N is a total number of pixel rows of the projection region on the hand 1 of the projection apparatus 2 in a direction from the end close to the projection apparatus 2 to the end away from the projection apparatus 2; i is a row number of a certain pixel in the projection region on the hand 1 of the projection apparatus 2 in the direction from the end close to the projection apparatus 2 to the end away from the projection apparatus 2.

An embodiment of the present invention further provides a wearable projection apparatus, comprising:

An acquisition device, configured to acquire pattern information of a plurality of regions of a hand;

A processing unit, configured to be in signal connection with the acquisition device and acquire color distribution information and brightness distribution information of the regions of the hand according to the pattern information of the regions of the hand acquired by the acquisition device, determining modified color output parameters according to the acquired color distribution information of the regions of the hand and a preset standard color information, and determining modified brightness output parameters according to the acquired brightness distribution information of the regions of the hand;

A projection module, configured to output an image according to the determined color output parameters and the determined brightness output parameters.

Exemplarily, the above-described acquisition device is an RGB camera, having a light-collecting direction in parallel with a light outgoing direction of the projection module.

For the projection method of the wearable projection apparatus and the wearable projection apparatus according to embodiments of the present invention, the projection module of the wearable projection apparatus is controlled according to the modified color output parameters and the modified brightness output parameters to output an image, thereby correcting influence of the hand color on the image projected by the wearable projection apparatus on the hand, and correcting influence of reflectivity and projection angle of different regions of the hand on the image projected by the wearable projection apparatus on the hand, so that the image projected by the wearable projection apparatus on the hand can have higher uniformity in color and brightness.

It is evident that one person skilled in the art can make various changes or modifications to the present invention without departing from the spirit and scope of the invention. Thus, if these changes and modifications to the present invention are within the scope of the claims of the present invention and equivalents, the present invention also intends to include all such changes and modifications within its scope.

The present application claims priority of Chinese Patent Application No. 201410175568.7 filed on Apr. 28, 2014, the disclosure of which is incorporated herein by reference in its entirety as part of the present application.

What is claimed is:

1. A projection method of a wearable projection apparatus, comprising:

acquiring color distribution information and brightness distribution information of a plurality of regions of a hand;

determining modified color output parameters according to the acquired color distribution information of the regions of the hand and preset standard color information, and determining modified brightness output parameters according to the acquired brightness distribution information of the regions of the hand; and
controlling a projection module to output an image according to the determined color output parameters and the determined brightness output parameters,
wherein:
the determining the modified color output parameters according to the acquired color distribution information of the regions of the hand and the preset standard color information, comprises:
determining a reference color value according to the acquired color distribution information of the regions of the hand, and determining the modified color output parameters according to the determined reference color value, the preset standard color information and the acquired color distribution information of the regions of the hand; and
the determining the modified color output parameters according to the determined reference color value, the preset standard color information and the acquired color distribution information of the regions of the hand, is performed by calculating using formulae as follows:

$$\begin{cases} \Delta U = U_s - U_0 \\ \Delta V = V_s - V_0 \end{cases}$$

$$\begin{cases} U'(x, y) = U(x, y) + \Delta U \\ V'(x, y) = V(x, y) + \Delta V \end{cases}$$

where, U'(x,y) is a modified red tone output parameter; V'(x,y) is a modified blue tone output parameter; U(x,y) is red tone information in the color distribution information of the regions of the hand; V(x,y) is blue tone information in the color distribution information of the regions of the hand; $U_s$ is red tone information in the preset standard color information; $U_0$ is a red tone value in the determined reference color value; $V_s$ is blue tone information in the preset standard color information; and $V_0$ is a blue tone value in the determined reference color value.

2. The projection method according to claim 1, wherein the acquiring the color distribution information and the brightness distribution information of the regions of the hand, comprises:
acquiring RGB pattern information of the regions of the hand; and
determining the color distribution information and the brightness distribution information of the regions of the hand according to the acquired RGB pattern information of the regions of the hand.

3. The projection method according to claim 1, wherein the reference color value is an average value of color information of all colors in a central region of the hand.

4. The projection method according to claim 1, wherein the determining the modified brightness output parameters according to the acquired brightness distribution information of the regions of the hand, comprises:
determining brightness correction factors of the regions of the hand according to the acquired brightness distribution information of the regions of the hand, and determining the modified brightness output parameters according to the brightness correction factors of the regions and the acquired brightness distribution information of the regions of the hand.

5. The projection method according to claim 4, wherein the determining the modified brightness output parameters according to the brightness correction factors of the regions and the acquired brightness distribution information of the regions of the hand is performed by calculating using formulae as follows:

Hand(x,y)=Y(x,y)/Y(max)

Y'(x,y)=Y(x,y)×Hand(x,y)

where Y'(x,y) is the modified brightness output parameter; Y(x,y) is the acquired brightness distribution information of the regions of the hand; Hand(x,y) is the brightness correction factor; and Y(max) is a highest brightness value in the acquired brightness distribution information of the regions of the hand.

6. The projection method according to claim 4, the determining the modified brightness output parameters according to the brightness correction factors of the regions and the acquired brightness distribution information of the regions of the hand is performed by calculating using formulae as follows:

$$Y' = Y * \partial$$

$$\partial = \left( a\tan \frac{h*\tan\theta_0 - \frac{L}{N}*\left(\frac{N}{2}-i\right)}{h} - a\tan \frac{h*\tan\theta_0 - \frac{L}{N}*\left(\frac{N}{2}-i+1\right)}{h} \right) / (\varphi/N)$$

where, Y' is the modified brightness output parameters; Y is the brightness distribution information of the regions of the hand; $\partial$ is the brightness correction factor; h is a distance from a center of a light outgoing surface of the projection apparatus to the hand; φ is a light outgoing angle of the light outgoing surface of the projection apparatus; $\theta_0$ is an angle between a centerline of the light outgoing angle of the light outgoing surface of the projection apparatus and the hand; L is a length of a projection region on the hand of the projection apparatus from an end close to the projection apparatus to an end away from the projection apparatus; N is a total number of pixel rows of the projection region on the hand of the projection apparatus in a direction from the end close to the projection apparatus to the end away from the projection apparatus; and i is a row number of a certain pixel in the projection region on the hand of the projection apparatus in the direction from the end close to the projection apparatus to the end away from the projection apparatus.

7. A wearable projection apparatus, comprising:
an acquisition device, configured to acquire pattern information of a plurality of regions of a hand;
a processing unit, configured to be in signal connection with the acquisition device and to acquire color distribution information and brightness distribution information of the regions of the hand according to the pattern information of the regions of the hand acquired by the acquisition device, determine modified color output parameters according to the acquired color distribution information of the regions of the hand and preset standard color information, and determine modified brightness output parameters according to the acquired brightness distribution information of the regions of the hand; and
a projection module, configured to output an image according to the determined color output parameters and the determined brightness output parameters,
wherein the processing unit is configured to determine the modified color output parameters according to the acquired color distribution information of the regions of the hand and the preset standard color information at least by:
  determining a reference color value according to the acquired color distribution information of the regions of the hand, and determining the modified color output parameters according to the determined reference color value, the preset standard color information and the acquired color distribution information of the regions of the hand; and
wherein the processing unit is configured to determine the modified color output parameters according to the determined reference color value, the preset standard color information and the acquired color distribution information of the regions of the hand by calculation using formulae as follows:

$$\begin{cases} \Delta U = U_s - U_0 \\ \Delta V = V_s - V_0 \end{cases}$$

-continued $$\begin{cases} U'(x, y) = U(x, y) + \Delta U \\ V'(x, y) = V(x, y) + \Delta V \end{cases}$$

where, $U'(x,y)$ is a modified red tone output parameter; $V'(x,y)$ is a modified blue tone output parameter; $U(x,y)$ is red tone information in the color distribution information of the regions of the hand; $V(x,y)$ is blue tone information in the color distribution information of the regions of the hand; $U_s$ is red tone information in the preset standard color information; $U_0$ is a red tone value in the determined reference color value; $V_s$ is blue tone information in the preset standard color information; and $V_0$ is a blue tone value in the determined reference color value.

8. The wearable projection apparatus according to claim 7, wherein the acquisition device is an RGB camera, having a light-collecting direction in parallel with a light-outgoing direction of the projection module.

* * * * *